United States Patent
Rihtar et al.

(10) Patent No.: US 10,738,745 B2
(45) Date of Patent: Aug. 11, 2020

(54) VEHICLE FUEL PUMP COVER ASSEMBLY AND METHOD

(71) Applicant: Honda Motor Co., Ltd., Tokyo (JP)

(72) Inventors: Jonathan A. Rihtar, Columbus, OH (US); Hiroshi Kitamura, Dublin, OH (US); Matthew E. Swanson, Richwood, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/034,065

(22) Filed: Jul. 12, 2018

(65) Prior Publication Data
US 2020/0018274 A1 Jan. 16, 2020

(51) Int. Cl.
*F02M 37/10* (2006.01)
*B60K 15/03* (2006.01)
*F02M 37/08* (2006.01)

(52) U.S. Cl.
CPC ........... *F02M 37/103* (2013.01); *B60K 15/03* (2013.01); *B60K 2015/03059* (2013.01); *B60K 2015/03447* (2013.01); *B60K 2015/03453* (2013.01); *F02M 2037/082* (2013.01); *Y10T 137/7043* (2015.04)

(58) Field of Classification Search
CPC ........... F02M 37/103; F02M 2037/082; B60K 15/03; B60K 2015/03447; B60K 2015/03453; B60K 2015/03059; B60K 2015/03243; Y10T 137/7043
See application file for complete search history.

(56) References Cited

U.S. PATENT DOCUMENTS

| | | | |
|---|---|---|---|
| 4,332,331 A | 4/1982 | Fawley | |
| 5,797,511 A | 8/1998 | Elsdon et al. | |
| 6,701,982 B1 * | 3/2004 | Ortiz | B67D 7/06 137/377 |
| 7,069,643 B2 | 7/2006 | Shevela et al. | |
| 7,341,047 B2 | 3/2008 | Sone et al. | |
| 2005/0194796 A1 | 9/2005 | Powell | |
| 2007/0039963 A1 | 2/2007 | Krentz et al. | |
| 2008/0035120 A1 * | 2/2008 | Sone | F02M 37/103 123/509 |
| 2017/0241385 A1 * | 8/2017 | Takayama | F02M 37/10 |

FOREIGN PATENT DOCUMENTS

| | | |
|---|---|---|
| CN | 203548023 | 4/2014 |
| CN | 203548031 | 4/2014 |
| EP | 2628937 | 8/2013 |
| JP | 2004182018 A * | 7/2004 |
| WO | 2015105627 | 7/2015 |

OTHER PUBLICATIONS

Image of fuel pump assembly with lock nut, obtained from https://www.autozone.com/repairguides/Chrysler-Full-Size-Trucks-1989-1996-Repair-Guide/FUEL-TANK/Tank-Assembly/_/P-0900c152800711b0.

* cited by examiner

*Primary Examiner* — Atif H Chaudry
(74) *Attorney, Agent, or Firm* — Rankin, Hill & Clark LLP (57) ABSTRACT

A cover assembly and method for a vehicle fuel pump includes a cover base secured in a fixed position relative to the vehicle fuel pump and a flexible cover connected to the cover base and positioned by the cover base to inhibit water access to the vehicle fuel pump. The method includes securing the cover base in a fixed position relative to the vehicle fuel pump, connecting the flexible cover to the cover base, and positioning the flexible cover with the cover base to inhibit water access to the vehicle fuel pump.

16 Claims, 7 Drawing Sheets

VEHICLE FUEL PUMP COVER ASSEMBLY AND METHOD

BACKGROUND

In a known arrangement, a fuel pump is disposed in the fuel tank of a vehicle. In particular, the fuel tank can include an upper opening through which the fuel pump is inserted and mounted. Depending on the arrangement of the vehicle frame and/or body, water potentially has access to this area of the fuel tank. Sometimes the aperture in the fuel tank through which the fuel pump is mounted is recessed relative to an upper side of the fuel tank, which can be even more problematic if water has access to the fuel pump.

BRIEF DESCRIPTION

According to one aspect, a cover assembly for a vehicle fuel pump includes a cover base secured in a fixed position relative to the vehicle fuel pump and a flexible cover connected to the cover base and positioned by the cover base to inhibit water access to the vehicle fuel pump.

According to another aspect, a fuel pump cover assembly for a vehicle includes a cover base annularly secured about a pump flange member of a fuel pump and a resilient cover secured in position over the pump flange member by the cover base for inhibiting water access to the fuel pump.

According to a further aspect, a cover method for covering a vehicle fuel pump includes securing a cover base in a fixed position relative to the vehicle fuel pump, connecting a flexible cover to the cover base, and positioning the flexible cover with the cover base to inhibit water access to the vehicle fuel pump.

DETAILED DESCRIPTION

Figure 1:
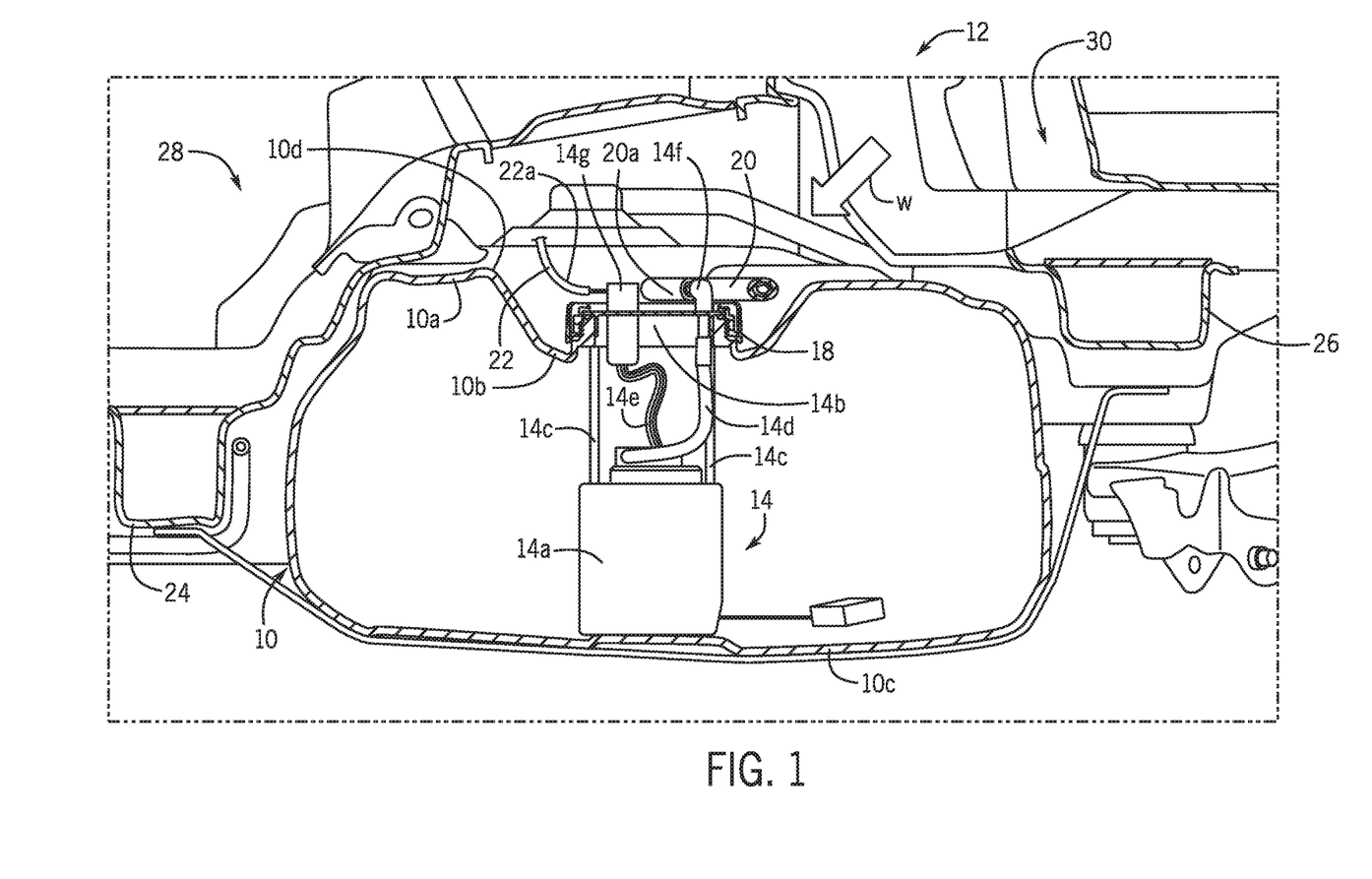
FIG. 1 schematically illustrates a cross-sectional view of a vehicle fuel pump mounted within a vehicle fuel tank.

Referring now to the drawings wherein the showings are for purposes of illustrating one or more exemplary embodiments and not for purposes of limiting the same, FIG. 1 illustrates a known arrangement wherein a vehicle fuel tank 10 is mounted within a vehicle 12. As shown, the fuel tank 10 includes a vehicle fuel pump 14 mounted through an upper opening or aperture 16 (also referred to herein as a fuel pump opening) defined in the fuel tank 10. In particular, the upper opening 16 is defined in an upper side 10a of the fuel tank 10 and, more particularly, is mounted within a recessed area 10b of the upper side 10a in the illustrated embodiment, though this is not required. As shown, the fuel pump 14 includes a main body 14a arranged adjacent or resting against a bottom wall 10c of the fuel tank 10. The fuel pump 14 further includes a pump flange or pump flange member 14b spaced apart from the main body 14a and supported by posts 14c extending upward from the main body 14a. The fuel pump 14 also includes fuel feed line 14d and electrical lines 14e, both extending from the main body 14a to the pump flange member 14b.

Figure 2:
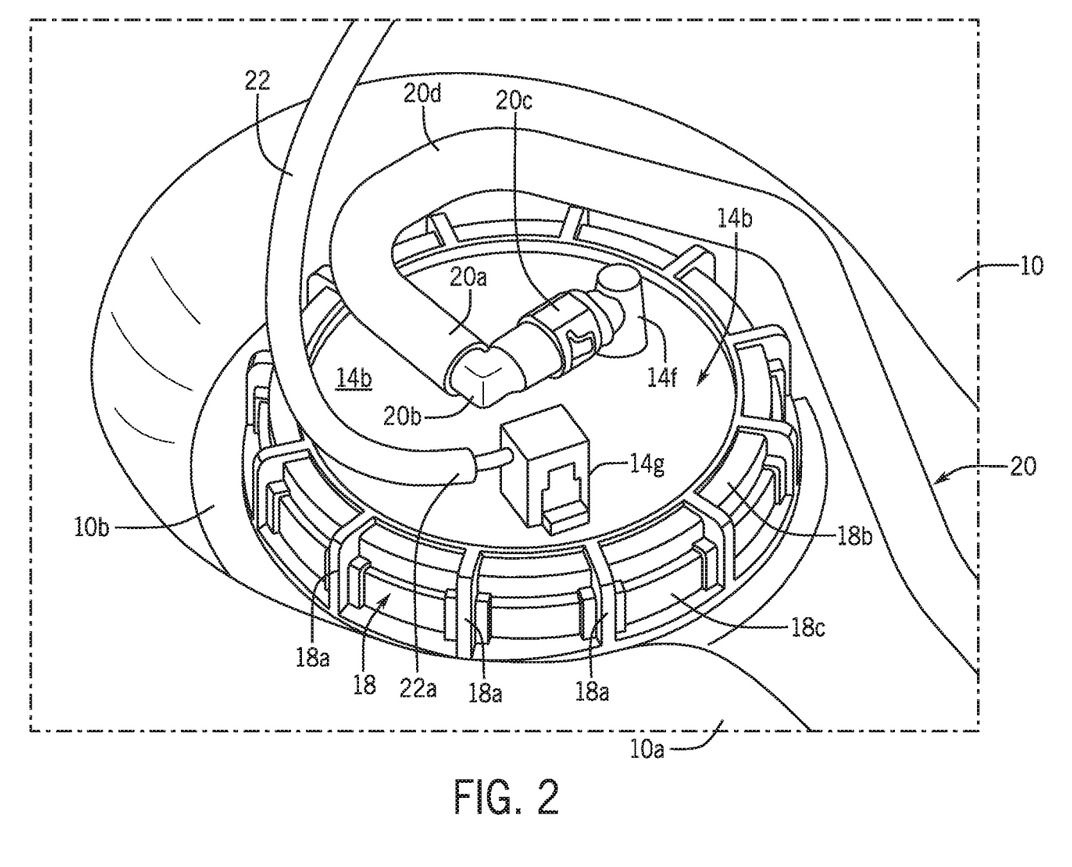
FIG. 2 is a partial perspective view of the vehicle fuel pump showing a pump flange member thereof secured within a recessed portion of the vehicle fuel tank and having fluid and electrical connections thereon.

More specifically and with additional reference to FIG. 2, the pump flange member 14b of the fuel pump 14 protrudes or extends through the upper opening 16 of the fuel tank 10 and is thus exposed outside the fuel tank 10. In the illustrated embodiment, the pump flange member 14b is cylindrical or disc shaped. The pump flange member 14b can be partially inserted into a neck portion 10d (FIG. 5) of the fuel tank 10 that defines the upper opening 16. The neck portion 10d can be externally threaded for securing the fuel pump 14 within the fuel tank 10. More specifically, an annular threaded mounting collar 18 can be internally threaded for threaded engagement with the neck portion 10d for securing the pump flange member 14b axially therebetween to thereby secure the fuel pump 14 within the fuel tank 10. When desired, the mounting collar 18 can be unthreaded from the neck portion 10d to release the fuel pump 14, such as when desirable to replace the fuel pump 14. As shown, the mounting collar 18 can include vertically extending (i.e., axially extending) circumferentially spaced apart ribs 18a that facilitate rotation of the mounting collar 18 relative to the fuel tank 10, such as when loosening or tightening the mounting collar 18 onto the fuel tank 10.

As shown, the pump flange member 14b can include an outlet port structure 14f fluidly connected to the fuel feed line 14d and an electrical adapter or connector 14g electrically connected to the electrical lines 14e. Both of the outlet port structure 14f and the connector 14g can be disposed on an exterior or exposed side 14h of the pump flange member 14b (i.e., these elements 14f, 14g are exposed and externally arranged relative to the fuel tank 10). A fuel feed line 20 has one end 20a connected to the outlet port structure 14f and an opposite end connected to an engine of the vehicle 12 (neither the opposite end, nor the engine are shown) to thereby fluidly connect the fuel pump 14 and the fuel tank 10 to the engine of the vehicle 12 and deliver fuel pumped by the fuel pump 14 from the fuel tank 10 to the engine. As shown, the fuel feed line 20 can include a feed tube 20b having an integrally formed coupling 20c provided at the end 20a for connection to the outlet port structure 14f and a foam protective layer 20d annularly disposed about the feed tube 20b. The wire harness or electrical line 22 has one end 22a connected to the connector 14g for electrically connecting the fuel pump 14, such as for providing power and/or electrical communications thereto.

In the illustrated embodiment, the fuel tank 10 is disposed between lateral frame members 24, 26 of the vehicle 12. The lateral frame members 24, 26 can extend laterally across the vehicle 12 and can be secured to the side frame members (not shown), such as side sill members or the like. In the illustrated embodiment, the fuel tank 10 is also arranged between a forward frame portion 28 of the vehicle 12 and a rearward frame portion 30. In one embodiment, the forward frame portion 28 is formed as part of the passenger compartment (now shown) of the vehicle 12 and the rearward frame portion 30 is formed as part of a load carrying bed portion (not shown) of the vehicle. Potentially, liquid or water can have access to the fuel tank 10, and particularly to the pump flange member 14*b*, as generally indicated by arrow W.

To avoid such water or liquid access, with additional reference to FIGS. 3-7, a fuel pump cover assembly 40 for the vehicle fuel pump 14 is shown according to an exemplary embodiment. In particular, in the illustrated embodiment, the cover assembly 40 includes a cover base 42 secured in a fixed position relative to the fuel pump 14 and a flexible or resilient cover 44 connected to the cover base 42 and positioned by the cover base 42 to inhibit water access to the fuel pump 14. In particular, and as will be described in more detail below, the cover base 42 is annularly secured about the pump flange member 14*b* of the fuel pump 14 and the flexible cover 44 is secured in position over the pump flange member 14*b* by the cover base 42 for inhibiting water access to the fuel pump 14. As already described hereinabove, the fuel pump 14 is received in the fuel tank 10 and has the pump flange member 14*b* extending through the upper opening 16 defined in the fuel tank 10 so as to be exposed outside the fuel tank 10 (i.e., the pump flange 14*b* is exposed outside the fuel tank 10). The flexible cover 44 is arranged to complementarily overlap the pump flange member 14*b* and thus covers the exposed portion of the pump flange member 14*b*.

As already described herein, the mounting collar 18 is threadedly connected to the fuel tank 10 in which the fuel pump 14 is disposed. In particular, the fuel pump 14 is secured to the fuel tank 10 by the mounting collar 18 via the mounting collar 18 being annularly received about the pump flange member 14*b* and threadedly secured to the fuel tank 10, and particularly threadedly secured to the neck portion 10*d* of the fuel tank 10. More specifically, the mounting collar 18 has a mounting collar flange portion 18*b* radially overlapping a peripheral edge portion 14*i* (FIG. 5) of the pump flange member 14*b* to axially capture the pump flange member 14*b* between the mounting collar flange portion 18*b* and a distal end portion 10*e* of the neck portion 10*d* of the fuel tank 10 that defines the upper opening 16 through which the fuel pump 14 is disposed. In addition to the mounting collar flange portion 18*b*, the mounting collar 18 also includes a threaded skirt portion 18*c* depending from the flange portion 18*b*. The threaded skirt portion 18*c* threadedly engages with a threaded portion of the neck portion 10*d* of the fuel tank 10 and radially captures the pump flange member 14*b*.

Figure 5:
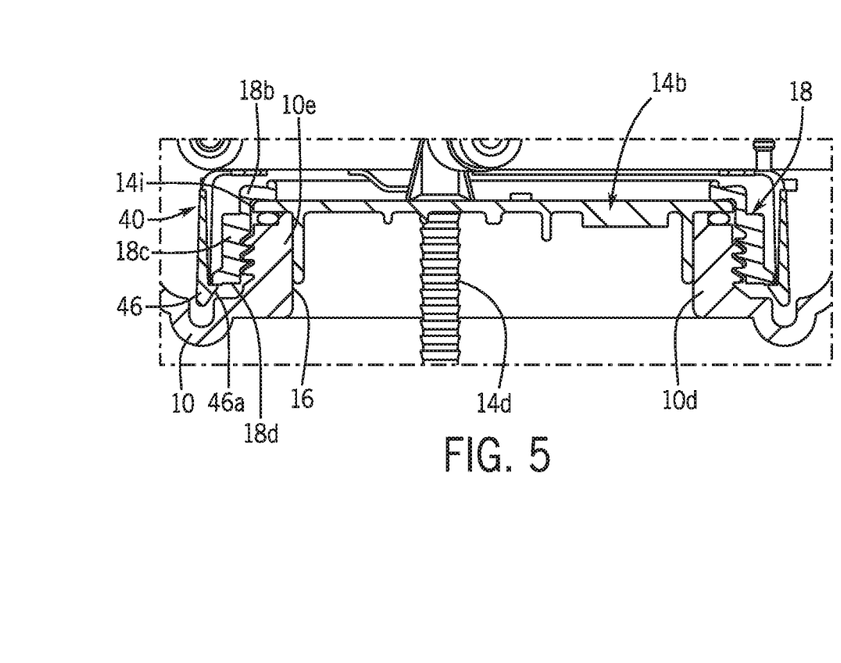
FIG. 5 is a partial cross-sectional view taken along the line 5-5 of FIG. 3.
Figure 7:
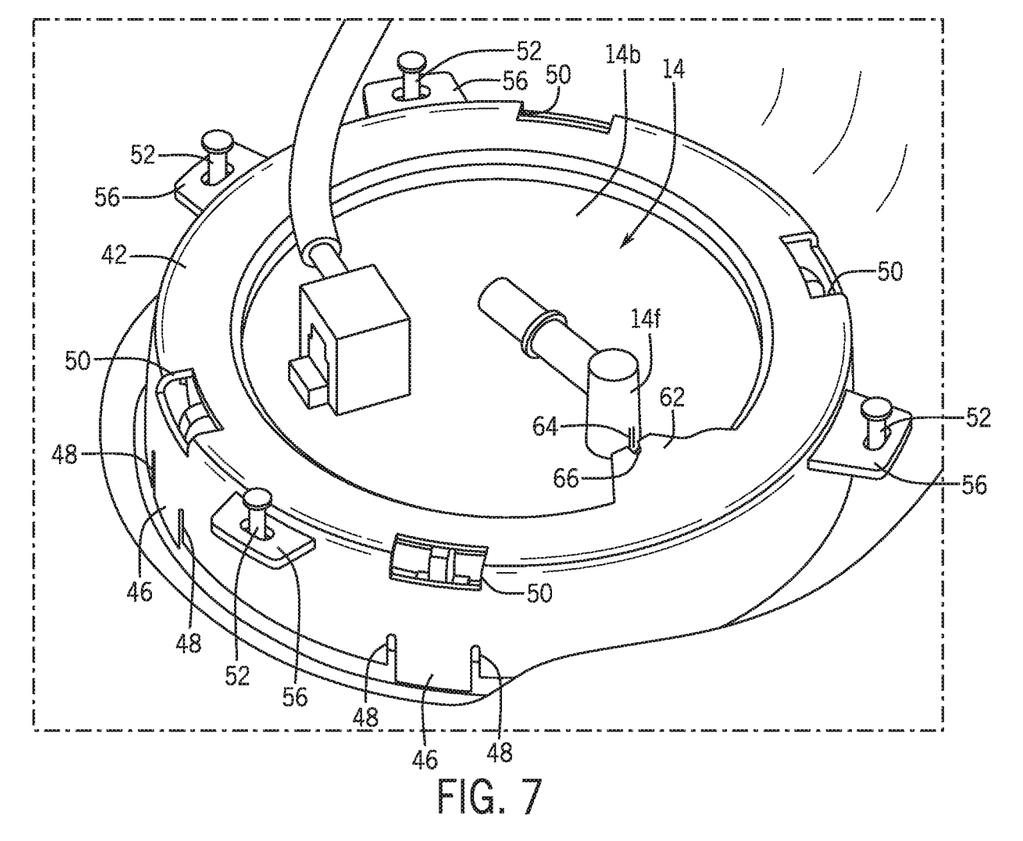
FIG. 7 is a partial perspective view similar to FIG. 4 but shown from a rotated perspective to illustrate a cooperative engagement feature between the cover base and the fluid connection disposed on the pump flange member.

In the illustrated embodiment, the cover base 42 complementarily overlaps the mounting collar 18 and is secured to the mounting collar 18. In particular, the cover base 42 includes a cover base flange portion 42*a* overlying the mounting collar flange portion 18*b* and a cover base skirt portion 42*b* depending from the cover base flange portion 42*a* and overlying the threaded skirt portion 18*c* of the mounting collar 18. As shown, in the illustrated embodiment, the cover base 42 is removably connected to the mounting collar 18 by a plurality of integrated clip elements. In the illustrated embodiment, as best shown in FIGS. 5 and 7, the plurality of integrated clip elements are resilient clip structures 46 disposed at circumferentially spaced locations on the cover base skirt portion 42*b*.

More particularly, in the illustrated embodiment, the cover base skirt portion 42*b* includes these resilient clip structures 46 that radially extend inwardly along a distal surface 18*d* of the threaded skirt portion 18*c* to axially capture the mounting collar 18 between the cover base flange portion 42*a* and the resilient clip structures 46. As shown, relief gaps 48 can be defined in the cover base skirt portion 42*b* so as to flank each of the resilient clip structures 46 and thereby, together with the material chosen for the cover base 42, provide resiliency to the resilient clip structures 46. This allows the clip structures 46 to be urged or bias toward the position illustrated in FIG. 5 wherein the clip structures 46 capture the distal surface 18*d* of the mounting collar 18 but are movable under a manually applied force toward radially outward directions to release the cover base 42 from the mounting collar 18. Also, as shown in the illustrated embodiment, apertures 50 can be defined into the cover base 42 at or near an intersecting area of the cover base flange portion 42*a* and the cover base skirt portion 42*b*.

The integrated clip elements, such as the resilient clip structures 46, can be provided in or at diametrically opposite locations on the cover base skirt portion 42*b*. In the illustrated embodiment, two sets of the clip structures 46 are provided (e.g., below each illustrated locating aperture 50) and each set includes a pair of diametrically opposed clip structures 46. Of course, it will be understood and appreciated that other arrangements for the clip structures 46 could be used or no clip structures could be provided. In the illustrated embodiment, the clip structures 46 each include a barbed end 46*a* that projects radially inwardly so as to capture the distal surface 18*d* of the threaded skirt portion 18*c* of the mounting collar 18.

For securing the flexible cover 44 to the cover base 42, the cover base 42 includes at least one studded projection 52 received through a corresponding aperture 54 defined in the flexible cover 44 for securing the flexible cover 44 to the cover base 42. In the illustrated embodiment, each of the at least one studded projection 52 is disposed on a tab 56. Particularly, as shown in the illustrated embodiment, each tab 56 extends radially outwardly from the skirt portion 42*b* adjacent where the skirt portion 42*b* depends from the flange portion 42*a*. In the illustrated embodiment, a plurality of tabs 56 each with a studded projection 52 disposed thereon is arranged circumferentially in spaced relation relative to one another about the cover base 42. As shown, the studded projection 52 extends approximately orthogonally relative to the tab 56 on which it is provided. Each studded projection 52 can include an enlarged head portion 52*a* provided distally thereon for retaining the flexible cover 44.

More particularly, for securing the flexible cover 44 to the cover base 42 and thereby for positioning the flexible cover 44, each studded projection 52 is received through a corresponding aperture 54 defined in the flexible cover 44. In the illustrated embodiment, the flexible cover 44 includes a main portion 44*a* overlapping the pump flange member 14*b* and overlapping the cover base flange portion 42*a*. As shown, the radial dimension of the cover base flange portion 42*a* can be approximately the same radial dimension as the flange portion 18*b* of the mounting collar 18, though this is not required. The radial dimension of the main portion 44*a* of the flexible cover 44 can be approximately the same or slightly larger than the radial or diameter dimension, and particularly the outer diameter dimension, of the cover base flange portion 42*a* and/or the cover base skirt portion 42*b*. The flexible cover 44 can also include a flexible cover skirt portion 44*b* depending downward from a peripheral edge of the main portion 44*a*. In one embodiment, the axial dimension or height dimension for the skirt portion 44b can be approximately the same as the same dimension for the cover base skirt portion 42b or slightly larger than the axial or height dimension of the cover base skirt portion 42b.

In the illustrated embodiment, the flexible cover 44 also includes recessed portions 44c in or on which the apertures 54 are disposed for cooperatively receiving the corresponding studded projections 52 therethrough. This secures the flexible cover 44 to the cover base 42. In particular, the flexible cover 44 can be formed of a relatively resilient material (e.g., flexible rubber) that allows for some deformation and therefore the enlarged head portions 52b of the studded projections 52 can be received through the corresponding apertures 54 but inhibit but not prevent removal of the flexible cover 44 from the cover base 42. In one embodiment, the cover base 42 is formed of a first material and the flexible cover 44 is formed of a second material, with the first material being relatively rigid and the second material being relatively soft and flexible, such as rubber.

Figure 3:
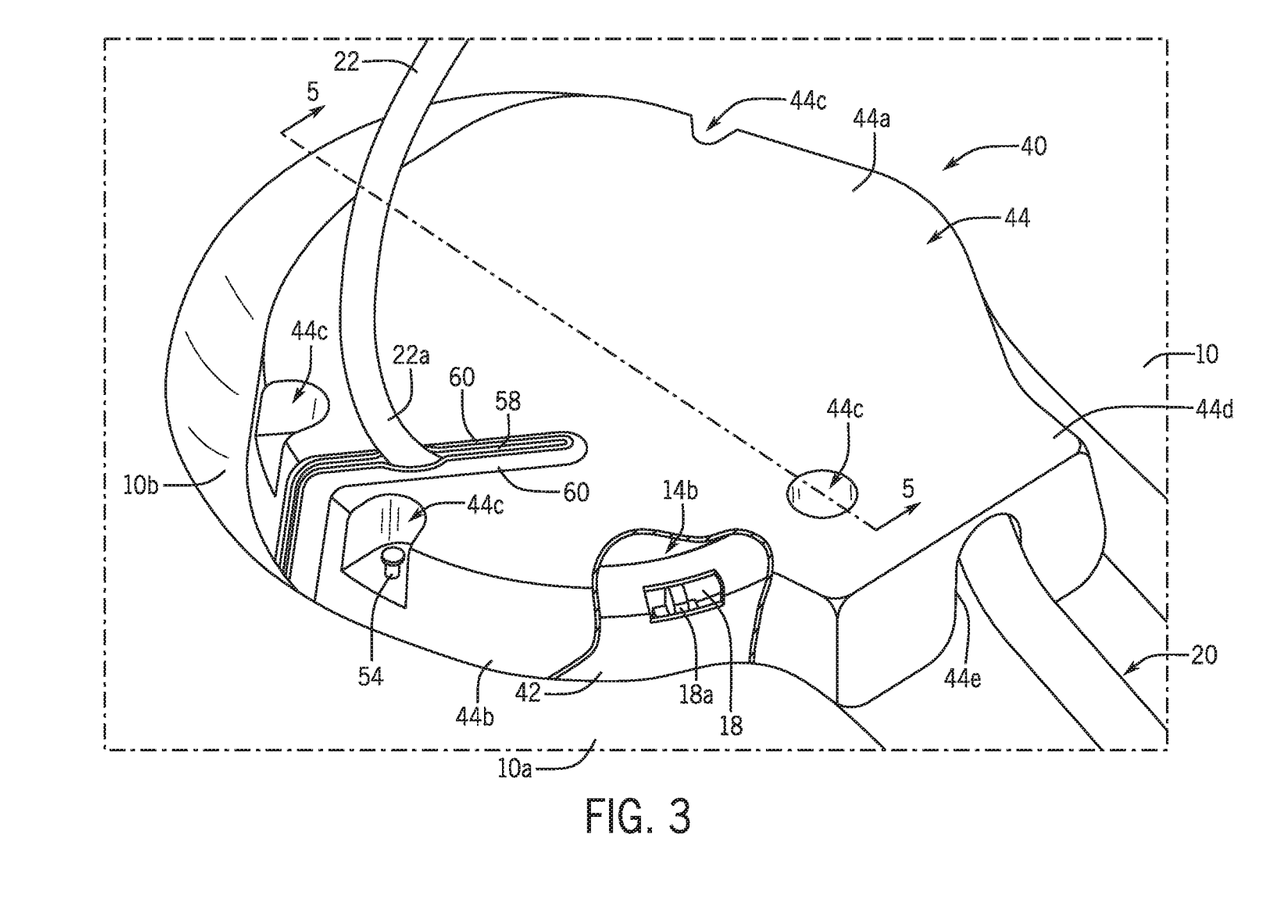
FIG. 3 is a partial perspective view similar to FIG. 2 but showing a cover assembly arranged over the vehicle fuel pump according to an exemplary embodiment.
Figure 4:
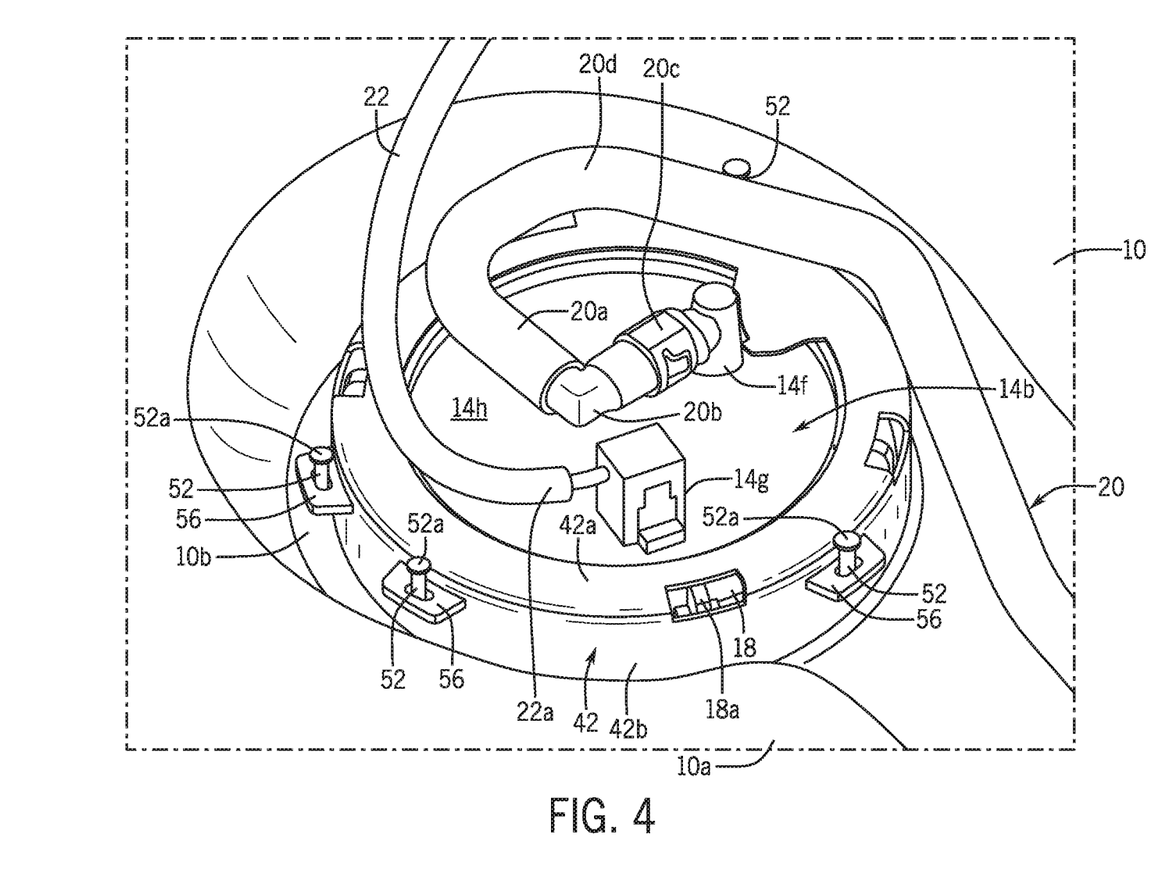
FIG. 4 is a partial perspective view similar to FIG. 3 but showing a flexible cover of the cover assembly removed from a cover base of the cover assembly.

In the illustrated embodiment, and with particular reference to FIG. 3, the flexible cover 44 also includes a protruding portion 44d that extends radially outwardly relative to the cover base 42, and particularly relative to the cover base skirt portion 42b. The protruding portion 44d includes a recess or aperture 44e through which the fuel line 20 passes. Also, the resilient cover 44 can include a wire harness aperture 58 through which the wire harness 22 passes. In the illustrated embodiment, the aperture 58 is a slot extending into the flexible cover 44 from a peripheral edge of the flexible cover 44 (i.e., from and through the skirt portion 44b). Specifically, the aperture 58 can extend inwardly radially into the main portion 44a from the peripheral edge a distance sufficient to clear or extend past the location at which the wire harness 22 extends upward from the fuel pump 14. As shown, the cover 44, and particularly the main portion 44a thereof, can include upturned lip portions 60 defining the aperture 58 for urging water away from the aperture 58.

Figure 6:
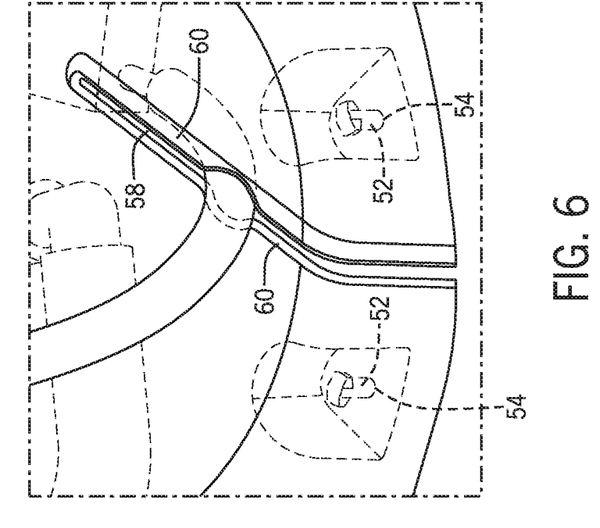
FIG. 6 is a partial enlarged perspective view showing a slotted aperture feature defined in the flexible cover for accommodating the electrical connection.

More specifically, with the cover 44 formed of a flexible material, the width of the aperture 58 and the slot configuration as shown can be smaller than an external diameter of the wire harness 22 such that passing of the wire harness 22 through the aperture 58 results in the upturned lip portions 60 curving upward as best shown in FIG. 6 so that any water or the like received on the main portion 44a will be urged away from the aperture 58 via the upturned lip portions 60. The upturned lip portions 60 can be referred to as a self-sealing portion or feature that closes about the wire harness 22. That is, as already described, passing of the wire harness 22 through the aperture 58 forces the upturned lip portions 60 upward; however, due to the resiliency of the material selected for the cover 44, the upturned lip portions 60 are urged toward one another thereby self-sealing about the wire harness 22.

With particular reference to FIG. 7, the cover base 42, and particularly the cover base flange portion 42a, includes a mating structure 62 that cooperatively engages a raised structure 64 disposed on the vehicle fuel pump 14, and particularly on the pump flange member 14b, to angularly position the cover base 42 relative to the fuel tank 10. In particular, the mating structure 62 projects radially inwardly from the cover base flange portion 42a and the raised structure 64 is a vertically oriented rib provided on the outlet port structure 14f. As shown, the mating structure 62 includes a notch 66 for receiving and accommodating the raised structure 64. This cooperative engagement also prevents relative rotation between the cover base 42 and the fuel pump 14.

By the foregoing, the flexible cover 44 is arranged or positioned over the fuel pump 14, and particularly over the pump flange member 14b. This has the effect of inhibiting water from reaching the fuel pump 14. This improves the longevity of the fuel pump 14.

Figure 8:
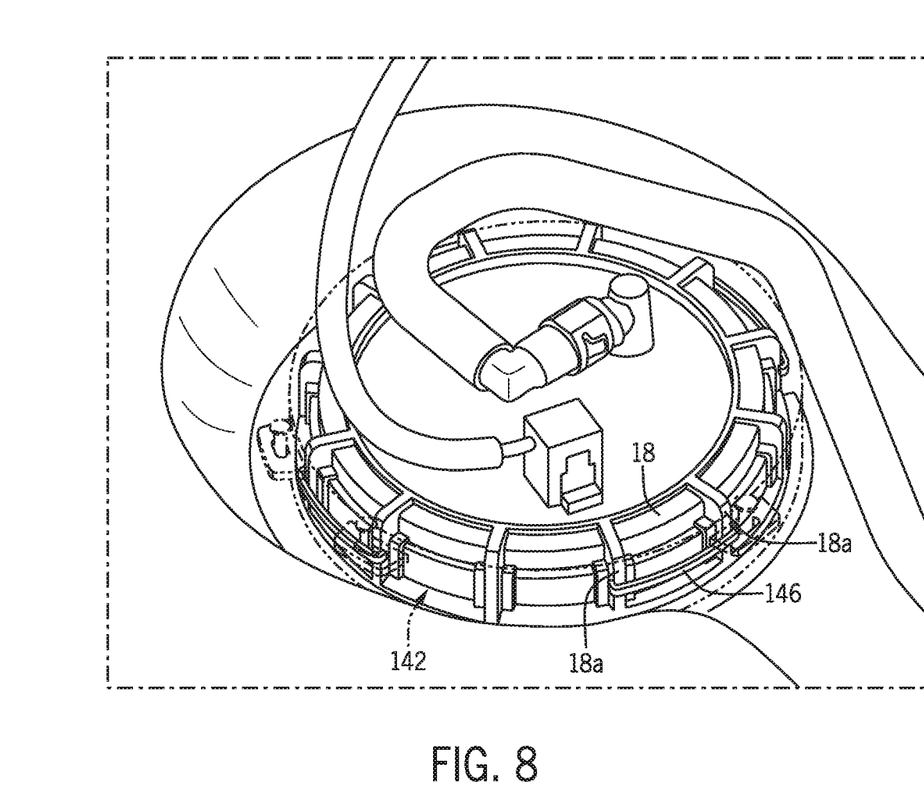
FIG. 8 is a partial perspective view similar to FIG. 4 but showing a cover base (in phantom) secured relative to the vehicle fuel pump according to an alternate exemplary embodiment.
Figure 9:
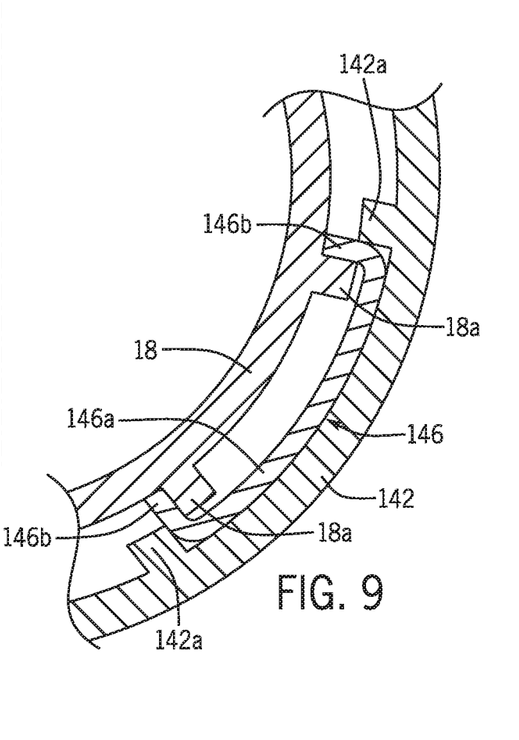
FIG. 9 is a partial enlarged cross-sectional view showing the cover base of FIG. 9 secured to a mounting collar by a spring feature, the mounting collar securing the vehicle fuel pump to the vehicle fuel tank.

With reference now to FIGS. 8 and 9, a cover base 142 is schematically illustrated according to an alternate exemplary embodiment. Except as indicated below, the cover base 142 can be the same or similar to the cover base 42 described hereinabove. In particular, the cover base 142 can be secured in a fixed position relative to the fuel pump 14 for mounting the flexible cover 44 and positioning the flexible cover 44 relative to the fuel pump 14. Unlike the cover base 42, the cover base 142 is secured to the mounting collar 18 via inwardly extending locking structures that resiliently connect to adjacent ones of the spaced ribs 18a on the mounting collar 18. In the illustrated embodiment of FIGS. 8 and 9, the inwardly extending locking structures are spring elements 146 having a main portion 146a and a pair of spaced apart leg portions 146b.

The leg portions 146b can be spaced apart a distance corresponding to a distance between adjacent ones of the spaced ribs 18a on the mounting collar so that the leg portions 146b resiliently grip the spaced ribs 18a. Also, the leg portions 146b can be disposed between inwardly extending protrusions 142a disposed on the cover base 142 in such a manner that the spring elements 146 are captured resiliently between the protrusions 142a. Accordingly, the spring elements 146 function to secure or mount the cover base 142 to the mounting collar 18. The cover 44 can be mounted to the cover base 142 in the same manner as described in association with the cover base 42 (e.g., via the studded projections 52, etc.). In a further alternate embodiment, the spring elements 146 can be secured to the cover base 142 via alternate connection means, such as via adhesive, other snap-fit connection, etc. In yet a further alternate embodiment, the leg portions 146b can be integrally molded and/or formed with the cover base 142 (i.e., not as a separate element) and could be provided to radially interlock with the ribs 18a so as to inhibit relative rotation between the cover base 142 and the mounting collar 18.

A cover method for covering the vehicle fuel pump will now be described. In particular, the cover method will be described in association with the fuel pump cover assembly 40 described hereinabove, though it is to be appreciated and understood that the method could be used with other fuel pump cover assemblies. In the method, cover base 42 (or cover base 142) is secured in a fixed position relative to the vehicle fuel pump 14. For example, the clip structures 46 are used to secure or mount the cover base 42 to the mounting collar 18, which is itself secured to the fuel tank 10 and secures the position of the fuel pump 14 relative to the fuel tank 10. Also in the method, the flexible cover 44 is connected to the cover base 42 and the flexible cover 44 is positioned by or with the cover base 42 to inhibit water access to the vehicle fuel pump 14 as described hereinabove.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A cover assembly for a vehicle fuel pump, comprising:
a cover base secured in a fixed position relative to the vehicle fuel pump; and
a flexible cover connected to the cover base and positioned by the cover base to inhibit water access to the vehicle fuel pump,
wherein the vehicle fuel pump is received within a vehicle fuel tank and has a pump flange member extending through a fuel pump opening defined in the vehicle fuel tank so as to be exposed outside the vehicle fuel tank,
wherein the vehicle fuel pump is secured to vehicle fuel tank by a threaded mounting collar, the threaded mounting collar annually received about the pump flange member and threadedly secured to the vehicle fuel tank, and
wherein the cover base complementarily overlaps the threaded mounting collar and is secured to the threaded mounting collar, and the flexible cover is arranged to complementarily overlap the pump flange member.

2. The cover assembly of claim 1 wherein the threaded mounting collar includes a mounting collar flange portion and a threaded skirt portion depending from the flange portion, the flange portion axially capturing the pump flange member and the threaded skirt threadedly engaged with a threaded portion of the vehicle fuel pump defining the fuel pump opening.

3. The cover assembly of claim 2 wherein the cover base includes a cover base flange portion overlying the mounting collar flange portion and a cover base skirt portion depending from the cover base flange portion and overlying the threaded skirt portion of the threaded mounting collar.

4. The cover assembly of claim 3 wherein the cover base skirt portion includes resilient clip structures that radially extend inwardly along a distal surface of the threaded skirt portion to axially capture the threaded mounting collar between the cover base flange portion and the resilient clip structures.

5. The cover assembly of claim 3 wherein the threaded mounting collar includes circumferentially spaced ribs extending axially on the threaded skirt portion for facilitating rotation of the threaded mounting collar, and wherein the cover base skirt portion includes at least two inwardly extending locking structures that resiliently connect to adjacent ones of the spaced ribs.

6. The cover assembly of claim 5 wherein the at least two inwardly extending locking structures include a pair of diametrically opposed locking structures.

7. The cover assembly of claim 1 wherein cover base includes at least one studded projection received through a corresponding aperture defined in the flexible cover for securing the flexible cover to the cover base.

8. The cover assembly of claim 1 wherein the flexible cover includes an aperture through which a wire harness passes, the wire harness electrically connected to the vehicle fuel pump.

9. The cover assembly of claim 8, wherein the aperture is a slot extending into the cover from a peripheral edge of the cover.

10. The cover assembly of claim 9 wherein the cover includes upturned lip portions defining the slot for urging water way from the slot.

11. The cover assembly of claim 1 wherein the cover base is formed of a first material and the flexible cover is formed of a second material, and wherein the first material is relatively rigid and the second material is relatively soft and flexible.

12. The cover assembly of claim 1 wherein the cover base includes a cover base flange portion and a cover base skirt portion depending from the cover base flange portion, and further wherein the cover base flange portion includes a mating structure that cooperatively engages a raised structure disposed on the vehicle fuel pump to angularly position the cover base relative to the vehicle fuel tank.

13. A fuel pump cover assembly for a vehicle, comprising:
a cover base annularly secured about a pump flange member of a fuel pump;
a resilient cover secured in position over the pump flange member by the cover base for inhibiting water access to the fuel pump; and
a mounting collar threadedly connected to a fuel tank in which the fuel pump is disposed, the mounting collar having a mounting collar flange portion radially overlapping a peripheral edge portion of the pump flange member to axially capture the pump flange member between the mounting collar flange portion and a distal end portion of a neck portion of the fuel tank that defines fuel tank opening through which the fuel pump is disposed.

14. The fuel pump cover assembly of claim 13 wherein the cover base is removably connected to the mounting collar by a plurality of integrated clip elements.

15. The fuel pump cover assembly of claim 14 wherein the cover base includes a cover base flange portion overlying the mounting collar flange portion and a cover base skirt portion depending downwardly from the cover base flange portion, the integrated clip elements disposed at diametrically opposite locations on the cover base skirt portion.

16. A cover method for covering a vehicle fuel pump, comprising:
securing the vehicle fuel pump to a vehicle fuel tank by a threaded mounting collar, including positioning the threaded mounting collar annually about a pump flange member extending through a fuel pump opening defined in the vehicle fuel tank;
securing a cover base in a fixed position relative to the vehicle fuel pump, including complementarily overlapping the threaded mounting collar with the cover base and securing the cover base to the threaded mounting collar;
connecting a flexible cover to the cover base and arranging the flexible cover to complementarily overlap the pump flange member; and
positioning the flexible cover with the cover base to inhibit water access to the vehicle fuel pump.

* * * * *